US009182262B2

(12) United States Patent
Wiest et al.

(10) Patent No.: US 9,182,262 B2

(45) Date of Patent: Nov. 10, 2015

(54) TEMPERATURE SENSOR AND THERMAL FLOW-MEASURING DEVICE

(71) Applicant: Endress + Hauser Flowtec AG, Reinach (CH)

(72) Inventors: Achim Wiest, Weil am Rhein (DE); Heinerich Hagenmeyer, Grenzach-Wyhlen (DE); Roy Senn, Birsfelden (CH); Tobias Baur, Reinach (CH)

(73) Assignee: Endress + Hauser Flowtec AG, Reinach (CH)

( * ) Notice: Subject to any disclaimer, the term of this patent is extended or adjusted under 35 U.S.C. 154(b) by 193 days.

(21) Appl. No.: 14/055,131

(22) Filed: Oct. 16, 2013

(65) Prior Publication Data

US 2014/0109664 A1 Apr. 24, 2014

(30) Foreign Application Priority Data

Oct. 19, 2012 (DE) ......................... 20 2012 104 035
Jul. 29, 2013 (DE) ......................... 20 2013 103 402

(51) Int. Cl.

*G01F 1/68* (2006.01)
*G01F 1/692* (2006.01)
*G01K 1/08* (2006.01)
*G01K 7/16* (2006.01)
*G01F 1/684* (2006.01)
*G01F 1/69* (2006.01)

(52) U.S. Cl.

CPC ................ *G01F 1/692* (2013.01); *G01F 1/684* (2013.01); *G01F 1/69* (2013.01); *G01K 1/08* (2013.01); *G01K 7/16* (2013.01)

(58) Field of Classification Search

None

See application file for complete search history.

(56) References Cited

U.S. PATENT DOCUMENTS 4,476,720 A 10/1984 Ismail
4,859,076 A * 8/1989 Twerdochlib .................. 374/10
5,892,149 A 4/1999 Theuer
2007/0024411 A1 2/2007 Lang
2012/0125093 A1 5/2012 Pfau

FOREIGN PATENT DOCUMENTS

DE 7832695 U1 6/1980
DE 19719010 A1 11/1997
DE 69410061 T2 1/1999

(Continued)

OTHER PUBLICATIONS

German Search Report, German PTO, Apr. 26, 2013.

*Primary Examiner* — Lisa Caputo
*Assistant Examiner* — Brandi N Hopkins
(74) *Attorney, Agent, or Firm* — Bacon & Thomas, PLLC

(57) ABSTRACT

A temperature sensor and a flow measuring device. The temperature sensor comprising: a housing which comprises a housing body from which at least a first shell and a second shell protrude, each of which shells comprises a first end section, a second end section and a longitudinal axis. A temperature sensor element is arranged, which has especially a thin-film resistance thermometer, wherein one of the temperature sensor elements is heatable, and which shells have outsides, which interface the housing with the environment. From each temperature sensor element at least one connection wire leads away, which is connected with a circuit board. The housing body has a housing chamber, which is connected with inner hollow spaces of the shells, wherein the circuit board is arranged in the housing chamber, and wherein the circuit board is positioned in the housing chamber by a snap-in connection.

14 Claims, 3 Drawing Sheets

23
1
24
22
21
3
20 4
20
29
26a
28
26
25
23
24
21
4
20
3

(56) References Cited

FOREIGN PATENT DOCUMENTS

| | | | | |
|---|---|---|---|---|
| DE | 19913968 | A1 * | 10/2000 | .............. G01F 1/688 |
| DE | 102010061731 | A1 | 5/2012 | |
| EP | 0652420 | B1 | 5/1995 | |
| GB | 2035683 | A | 6/1980 | |

* cited by examiner

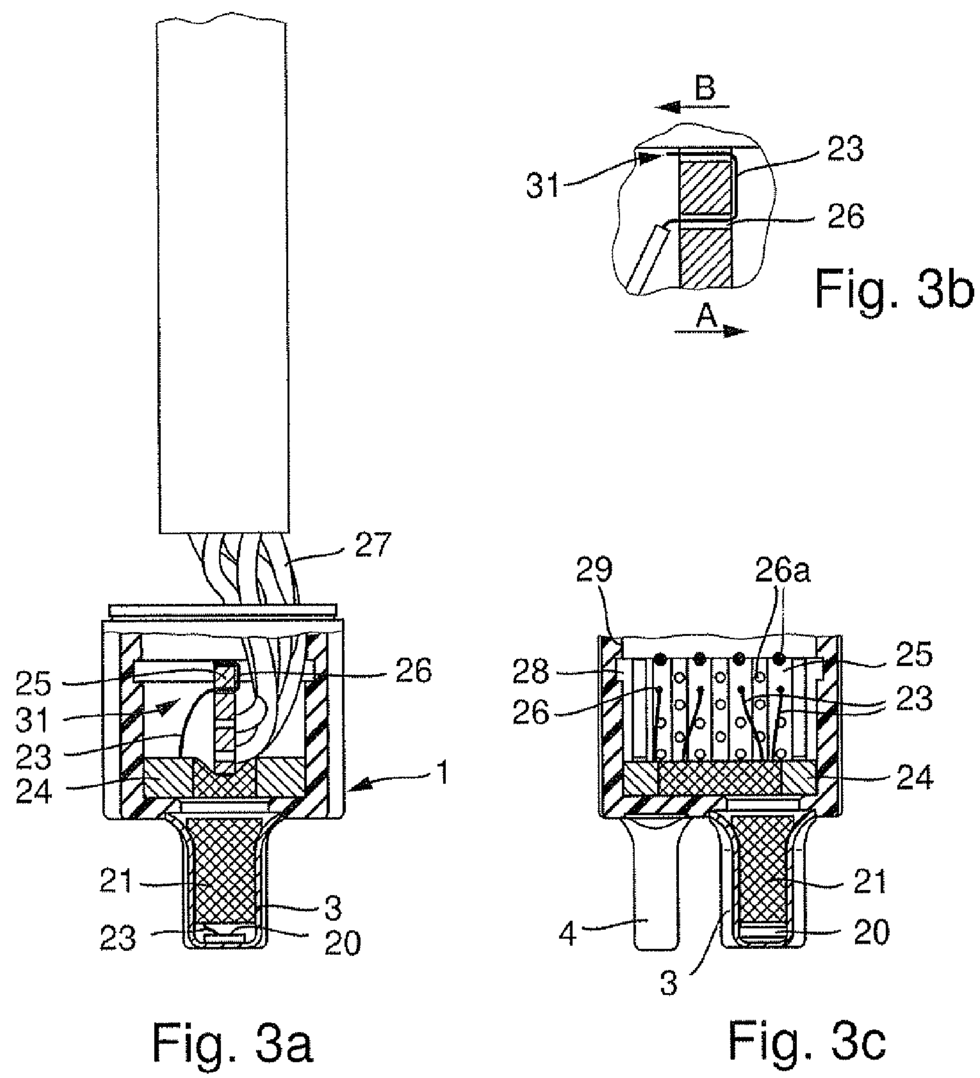
B
23
31
26
A
Fig. 3b
27
25
26
31
23
24
1
21
3
23
20
Fig. 3a
29
26a
28
25
26
23
24
21
4
20
3
Fig. 3c
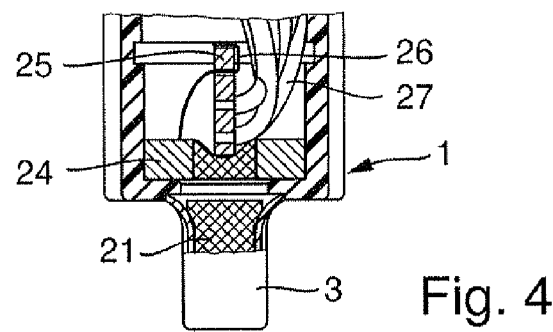
25
26
27
24
1
21
3
Fig. 4

TEMPERATURE SENSOR AND THERMAL FLOW-MEASURING DEVICE

TECHNICAL FIELD

The present invention relates to the construction of a temperature sensor and to a thermal flow-measuring device.

BACKGROUND DISCUSSION

Known from the state of the art are temperature sensors for industrial process technology. Their construction is similar to that of thermal flow-measuring devices, with the difference that conventional thermal flow-measuring devices usually use two temperature sensors embodied as equally as possible, which are, most often, arranged in pin-shaped, metal shells, so-called stingers or prongs, and lie in thermal contact with the medium flowing through a measuring tube or through the pipeline. Most often, they are immersed in the medium. For industrial application, the two temperature sensors are usually installed in a measuring tube; the temperature sensors can, however, also be mounted directly in the pipeline. One of the two temperature sensors is a so-called active temperature sensor, which is heated by means of a heating unit and which determines a temperature. Provided as a heating unit is either an additional resistance heater, or the temperature sensor itself is a resistance element, e.g. an RTD (Resistance Temperature Device) sensor, which is heated by conversion of electrical power, e.g. by a corresponding variation of the measuring electrical current. The second temperature sensor is a so-called passive temperature sensor: It measures the temperature of the medium at an as small as possible self-warming by the measuring current.

To this point in time, mainly RTD elements with helically wound platinum wires have been applied in thermal flow-measuring devices. In the case of thin-film resistance thermometers (TF-RTDs), conventionally, a meander-shaped platinum layer is vapor deposited on a substrate. Then another glass layer is applied for protecting the platinum layer. The cross section of the thin-film resistance thermometer is rectangular, in contrast with the round cross section of RTD-elements. The heat transfer into the resistance element and/or from the resistance element occurs accordingly via two oppositely lying surfaces, which together make up a large part of the total surface of a thin-film resistance thermometer.

German Patent DE 10 2010 061 731 A1 discloses a temperature sensor of a thermal flow-measuring device and its housing construction. Used therein are TF-RTDs.

To this point in time, connection concepts for RTDs in sensor housings are associated with a mounting of the RTDs in shells. Their connection wires are led from the shells.

SUMMARY OF THE INVENTION

An object of the present invention is to lessen the rejection rate in the production of temperature sensors and to enable an easier assembly of the temperature sensor, as well as to provide a corresponding flow measuring device The object is achieved by a temperature sensor and by a flow measuring device, whereby the temperature sensor includes a housing comprising a housing body, from which at least a first shell and a second shell protrude, each of which shells comprises a first end section, a second end section and a longitudinal axis, wherein the longitudinal axis extends between the first and second end sections, in which shells in the region of the first end section, in each case, a temperature sensor element is arranged, which has especially a thin-film resistance thermometer, wherein one of the temperature sensor elements is heatable, and which shells have outsides, which interface the housing with the environment. From each temperature sensor element at least one connection wire leads away, which is connected with a circuit board, wherein the housing body has a housing chamber, which is connected with inner hollow spaces of the shells, wherein the circuit board is arranged in the housing chamber, and wherein the circuit board is positioned in the housing chamber by a snap-in connection.

Positioning the circuit board in the housing chamber by means of a snap-in connection facilitates assembly.

The snap-in connection can be produced advantageously by shape interlocking between the circuit board and the housing body. It is, indeed, also possible to provide in the housing chamber special housing inserts, which enable the snap-in connection. This would, however, lead to lessened space for the additional components within the housing chamber and is, consequently, not preferred.

Also according to the invention, a temperature sensor includes a housing comprising a housing body, from which at least a first shell and a second shell protrude, each of which shells comprises a first end section, a second end section and a longitudinal axis, wherein the longitudinal axis extends between the first and second end sections, in which shells in the region of the first end section, in each case, a temperature sensor element is arranged, which has especially a thin-film resistance thermometer, wherein one of the temperature sensor elements is heatable, and which shells have outsides, which interface the housing with the environment, wherein from each temperature sensor element at least one connection wire leads away, which is connected with a circuit board, wherein the housing body has a housing chamber, which is connected with inner hollow spaces of the shells, and wherein the connection wire is connected with strain relief with the circuit board.

It is advantageous when the connection wire is surrounded in the region of the circuit board with a potting compound.

It is additionally advantageous when the strain relieving connection of the connection wire with the circuit board is accomplished by an extension of the connection wire through a first hole in the circuit board in a direction A and a securement of the connection wire in a direction B, which is opposite to the direction A. In this way, the connection wire describes a u-shape and, under tension, binds on edges of the circuit board.

Also according to the invention, a temperature sensor, especially a sensor of a thermal flow-measuring device, includes a housing comprising a housing body, from which at least a first shell and a second shell protrude, each of which shells comprises a first end section, a second end section and a longitudinal axis, wherein the longitudinal axis extends between the first and second end sections, in which shells in the region of the first end section, in each case, a temperature sensor element is arranged, which has especially a thin-film resistance thermometer, wherein one of the temperature sensor elements is heatable, and which shells have outsides, which interface the housing with the environment, wherein from each temperature sensor element at least one connection wire leads away, which is connected with a circuit board, wherein the housing body has a housing chamber, which is connected with inner hollow spaces of the shells, wherein the circuit board is arranged in the housing chamber, wherein the circuit board has a first number of cavities, especially holes, for the connection of connection wires and/or cables and a second number of cavities, especially holes, for reducing thermal expansion of the circuit board.

In such case, the second number of cavities, especially holes, can be arranged in conductive traces arranged on the circuit board.

Also according to the invention, a temperature sensor includes a housing comprising a housing body, from which at least a first shell and a second shell protrude, each of which shells comprises a first end section, a second end section and a longitudinal axis, wherein the longitudinal axis extends between the first and second end sections, in which shells in the region of the first end section, in each case, a temperature sensor element is arranged, which has especially a thin-film resistance thermometer, wherein one of the temperature sensor elements is heatable, and which shells have outsides, which interface the housing with the environment, wherein from each temperature sensor element at least one connection wire leads away, wherein the housing body has a housing chamber, which is connected with inner hollow spaces of the shells and wherein at least one of the shells has a first elastic body for guiding the connection wire.

The elastic body provides a smaller susceptibility of the measurement signal being affected by vibrations.

Thus it is advantageous, when the housing, especially the housing chamber, has a second elastic body, which is supported on the first elastic body and/or on a wall of the housing and which exerts a return force on the engaged circuit board. Preferably, this second elastic body can be embodied as a disk with a central cavity, through which the connection cable can be led.

Especially, the first and second elastic bodies can be silicone bodies. Silicone has good temperature and chemical resistance.

A good state of sealing by the elastic bodies, especially in the case of their embodiment as silicone bodies, can also be achieved in the case of temperature sensors, which are embodied as four conductor measuring devices.

Also according to the invention, a flow measuring device includes at least one temperature sensor as noted above and an evaluation unit.

BRIEF DESCRIPTION OF THE DRAWINGS

The invention can be provided in numerous forms of embodiment. Some thereof will now be explained in greater detail based on the appended figures of the drawing. Equal elements are provided in the figures with equal reference characters. The figures of the drawing show as follows:

FIGS. 3*a*, 3*b* and 3*c* show views of a second temperature sensor of the invention; and FIG. 4 is a representation of the second temperature sensor with potted components.

DETAILED DISCUSSION IN CONJUNCTION WITH THE DRAWINGS

Known are sensors for flow measuring devices, which work according to the thermal measuring principle. This measuring principle rests on the cooling of a heated resistance thermometer, subsequently also referred to as the heating, or active, sensor element, from which heat is withdrawn by the flowing, measured medium. The withdrawn energy is balanced by increasing the electrical heating current. In this way, a constant temperature difference is established between the heating sensor element and a present, reference temperature sensor, which is subsequently also referred to as the measuring, or passive, sensor element. The greater the mass flow, the more energy is required to maintain this difference. The measured heating current is, as a result, proportional to the mass flow. The thermal measuring principle is well established in processes, in which a product is made from a raw or starting material by the application of chemical, physical or biological procedures and is applied successfully in numerous applications. Especially demanding is the application of the measuring principle in water and other liquids, such as e.g. oil, since, in such cases, the heat transfers and required heating power are significantly higher than in the case of gases.

Figure 1:
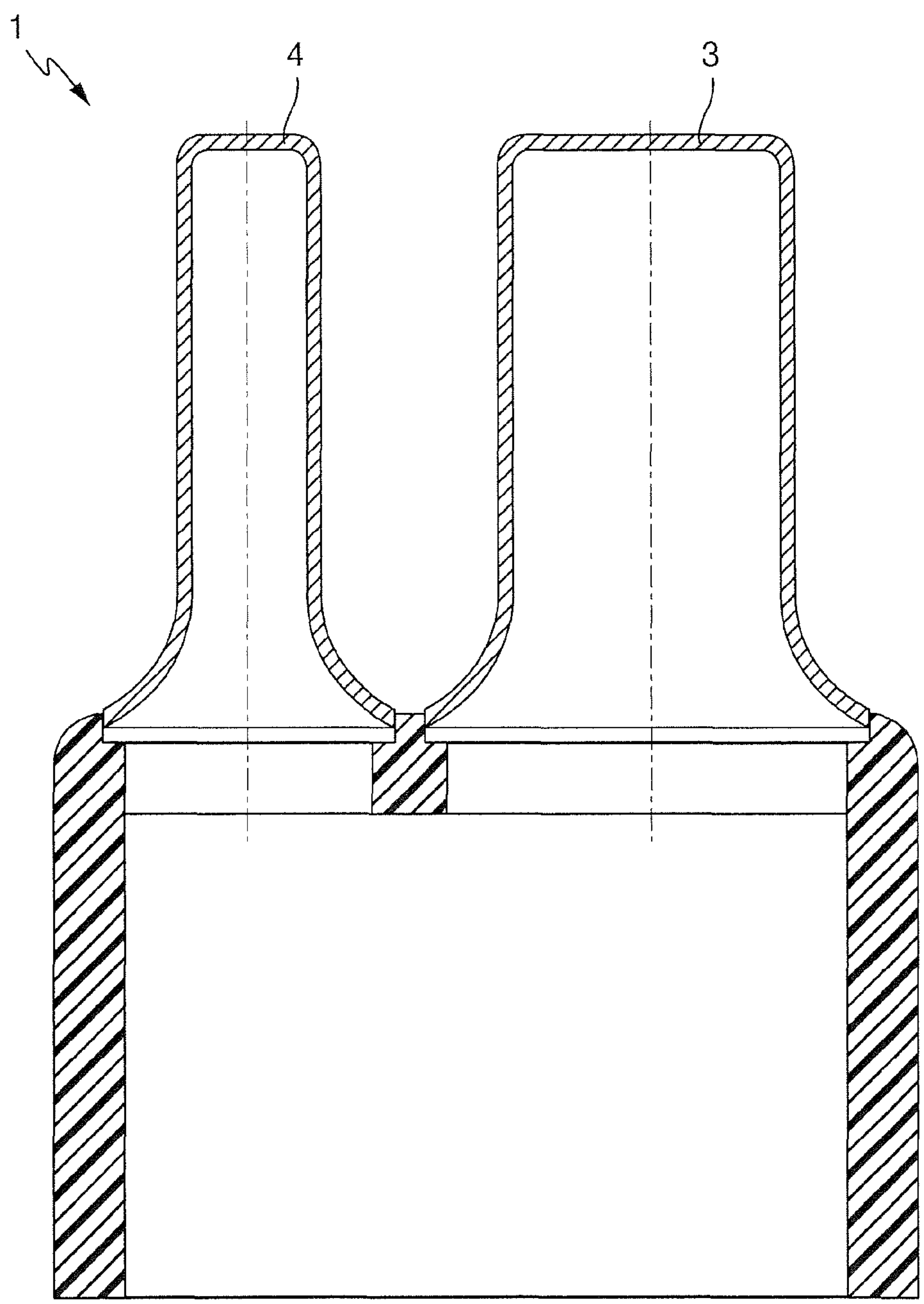
FIG. 1 is a housing of a temperature sensor of a thermal flow-measuring device in longitudinal section, from the state of the art.

FIG. 1 shows, only by way of example, a housing 1 of a thermal flow-measuring device in longitudinal section, such as is disclosed in German patent DE 10 2010 061 731 A1 (US 2012/0125093 A1), which is incorporated here by reference.

Integrated in the temperature sensor of the invention shown in FIGS. 2-5, in such case, are components, which contribute to facilitating the manufacture and reducing the rejection rate.

Figure 2:
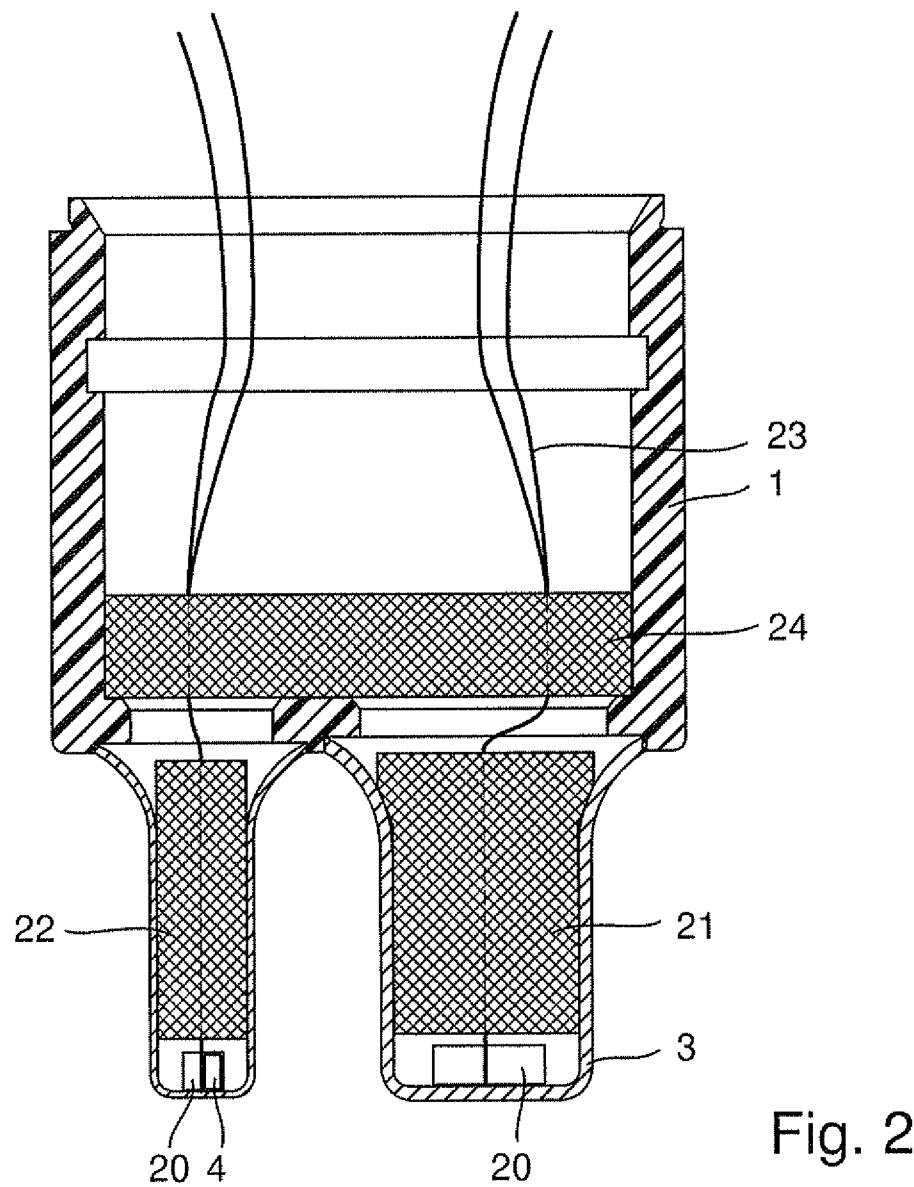
FIG. 2 is a schematic representation of a first temperature sensor of the invention.

FIG. 2 shows the construction of a temperature sensor of the invention and includes the housing 1 already described in German patent DE 10 2010 061 731 A1 and the two shells 3 and 4. In such case, the temperature sensor in the context of the present invention is not limited to two asymmetric shells, but, instead, can also have two symmetric shells.

Terminally inserted in each of the shells 3 or 4 are resistance thermometers (RTD) 20, of which at least one resistance thermometer is heatable and which in the present example of an embodiment are embodied as thin-film resistance thermometers. For simplification, subsequently only the arrangement of the resistance thermometer 20 in shell 3 will be explained.

The resistance thermometer is soldered on the inside of the housing 1 in the shell. Leading from the resistance thermometer 20 are two signal paths here in the form of connection wires 23, which are preferably gold coated. These connection wires provide a connecting of the thin-film resistance thermometer to a circuit board, which is presented in greater detail in FIGS. 3 *a*-*c* in a selection of views.

As shown in FIG. 3*a*, the connection wires 23 are, first of all, led along the outside of the shell and, then, to a circuit board 25, where they are secured to the circuit board 25 with strain relief. The strain relieving securement of the connection wires facilitates the assembly of the temperature sensor and lessens the rejection rate in the production process. In the region between the thin film-resistance thermometer and the circuit board, the connection wires are preferably jacketed with a Teflon tube (not illustrated in greater detail).

Leaving the circuit board 25 are a plurality of signal paths in the form of jacketed cables 27, which connect the temperature sensor with an evaluation unit.

After the assembly of the temperature sensor, the inner space of the temperature sensor is filled with a potting compound 30. This serves, on the one hand, to affix the electronic components. A correspondingly potted temperature sensor is shown in FIG. 4.

Circuit board 25 includes lateral snap-in elements 28, which, such as presented in FIG. 3*c*, can engage in a seat, respectively with a protrusion, 29 of the housing 1. Through the snap-in, a positioning of the circuit board at a predetermined position in the housing is possible. On the whole, this determining of the position the circuit board in the housing leads to a faster assembly.

Alternatively or supplementally, housing 1 can also have snap-in elements, which can engage with a seat or protrusion of the circuit board 25.

The shells 3 and 4 of the temperature sensor and a thereto adjoining region of the housing 1 are filled with cylindrical silicone bodies 21, 22, 24.

The strain relieving securement, respectively connection, 31 of the connection wires 23 to the circuit board 26 will now be explained in greater detail.

The strain relieving securement is presented in detail in FIG. 3*b*. This occurs in such a manner that the connection wires are led through a first hole 26 in the circuit board 25, then in a direction perpendicular to the passageway of the first hole 26 and then in a direction parallel to the passageway on the side of the circuit board, where they are secured. Thus, the securement occurs on a circuit board sidewall, which extends parallel to the first hole. Thus, the connection wires are inserted in a first direction A into the hole of the circuit board and secured on the circuit board in a second direction B, which is opposite to the first direction A.

In addition to the holes, respectively bores, which are intended for the connection of the connection wires and/or cables, the circuit board includes still other holes 26*a*.

Such strain relieving arrangements on boards are already known from other fields of application and provide a lasting securement of connection wires to a circuit board.

In the present case, the strain relief 31 of the connection wires serves supplementally for a better stability of the connection before and during the potting.

Stainless steel represents an especially preferred material for the shells, such that the shells are sufficiently resistant to corrosion.

The above described connection concept can be applied basically for all known multi-conductor measuring techniques of thermal flow measurement.

The invention claimed is:

1. A temperature sensor, of a thermal flow-measuring device, comprising:

a housing, which comprises a housing body from which at least a first shell and a second shell protrude, each of which shells comprises a first end section, a second end section and a longitudinal axis, said longitudinal axis extends between said first and said second end sections;

a temperature sensor element arranged in the region of said first end section, which has especially a thin-film resistance thermometer; and from each temperature sensor element at least one connection wire leads away, which is connected with a circuit board, wherein:

one of said temperature sensor elements is heatable, and which shells have outsides, which interface the housing with the environment;

said housing body has a housing chamber, which is connected with inner hollow spaces of said shells; and said circuit board is arranged in said housing chamber, and is positioned in said housing chamber by a snap-in connection.

2. The temperature sensor as claimed in claim 1, wherein:

said snap-in connection is produced by shape interlocking between said circuit board and said housing body.

3. The temperature sensor as claimed in claim 1, wherein:

the strain relieving connection of said connection wire with said circuit board is by an extension of said connection wire through a first hole in said circuit board in a direction (A) and a securement of said connection wire in a direction (B), which is opposite to the direction (A).

4. The temperature sensor as claimed in claim 1, wherein:

said housing chamber has a second elastic body, which is supported on said first elastic body and/or on a wall of said housing, and which exerts a return force on the engaged circuit board.

5. The temperature sensor as claimed in claim 1, wherein:

said first elastic body is provided for lessening thermal and mechanical stresses of said connection wire in the case of tension.

6. The temperature sensor as claimed in claim 1, wherein:

said first and said second elastic bodies are silicone bodies.

7. The temperature sensor as claimed in claim 1, wherein:

the temperature sensor is embodied as a four conductor measuring device.

8. The temperature sensor as claimed in claim 1, wherein:

at least the shells comprise stainless steel.

9. The temperature sensor, of a thermal flow-measuring device, comprising:

a housing, which comprises a housing body from which at least a first shell and a second shell protrude, each of which shells comprises a first end section, a second end section and a longitudinal axis, said longitudinal axis extends between said first and said second end sections;

a temperature sensor element arranged in the region of said first end section, which has especially a thin-film resistance thermometer; and from each temperature sensor element at least one connection wire leads away, which is connected with a circuit board, wherein:

one of said temperature sensor elements is heatable, and which shells have outsides, which interface the housing with the environment;

said housing body has a housing chamber, which is connected with inner hollow spaces of said shells; and said circuit board is arranged in said housing chamber, said circuit board has a first number of cavities, especially holes, for the connection of connection wires and/or cables and a second number of cavities, especially holes, for reducing thermal expansion of said circuit board.

10. The temperature sensor as claimed in claim 9, wherein:

said cavities, especially holes, are arranged in conductive traces arranged on said circuit board.

11. The temperature sensor, of a thermal flow-measuring device, comprising:

a housing, which comprises a housing body from which at least a first shell and a second shell protrude, each of which shells comprises a first end section, a second end section and a longitudinal axis, said longitudinal axis extends between said first and said second end sections;

a temperature sensor element arranged in the region of said first end section, which has especially a thin-film resistance thermometer; and from each temperature sensor element at least one connection wire leads away, which is connected with a circuit board, wherein:

one of the temperature sensor elements is heatable, and which shells have outsides, which interface the housing with the environment;

said housing body has a housing chamber, which is connected with inner hollow spaces of said shells; and said connection wire is connected with strain relief with said circuit board.

12. The temperature sensor as claimed in claim 11, wherein:

said connection wire is surrounded in the region of said circuit board with a potting compound.

13. A temperature sensor, of a thermal flow-measuring device, comprising:

a housing, which comprises a housing body from which at least a first shell and a second shell protrude, each of which shells comprises a first end section, a second end section and a longitudinal axis, said longitudinal axis extends between said first and said second end sections, a temperature sensor element arranged in the region of said first end section, which has especially a thin-film resistance thermometer; and from each temperature sensor element at least one connection wire leads away, wherein the housing body has a housing chamber, which is connected with inner hollow spaces of said shells, wherein:

one of the temperature sensor elements is heatable, and which shells have outsides, which interface the housing with the environment; and at least one of said shells has a first elastic body for guiding said connection wire.

14. A flow measuring device comprising a temperature sensor of a thermal flow-measuring device, comprising:

a housing, which comprises a housing body from which at least a first shell and a second shell protrude, each of which shells comprises a first end section, a second end section and a longitudinal axis, said longitudinal axis extends between said first and said second end sections;

a temperature sensor element arranged in the region of said first end section, which has especially a thin-film resistance thermometer; and from each temperature sensor element at least one connection wire leads away, which is connected with a circuit board, wherein: one of said temperature sensor elements is heatable, and which shells have outsides, which interface the housing with the environment; said housing body has a housing chamber, which is connected with inner hollow spaces of said shells; and said circuit board is arranged in said housing chamber, and is positioned in said housing chamber by a snap-in connection; and an evaluation unit.

* * * * *